Feb. 23, 1932.   A. J. COOK   1,846,847
COMBINED WHEELS, AXLE, AND ANTIFRICTION BEARINGS
Filed Sept. 2, 1931

INVENTOR

Patented Feb. 23, 1932

1,846,847

UNITED STATES PATENT OFFICE

ADONIRAM J. COOK, OF WESTERLO, NEW YORK

COMBINED WHEELS, AXLE, AND ANTIFRICTION BEARINGS

Application filed September 2, 1931. Serial No. 560,712.

The invention relates to combined axle and wheels with interposed anti-friction bearings, each of said anti-friction bearings preferably being located inside the hub of a wheel and in line with or adjacent to a plane passing through the tread and hub of the wheel, the object being the provision of a combination wherein the wheels are connected so that they will maintain their normal relative positions each to the other under all conditions of service and will rotate together, and wherein the anti-friction elements between the wheels and axle will, as far as possible, eliminate friction and be protected from dust.

The accompanying drawings illustrate an example of the embodiment of the invention and a modification of the antifriction bearings, the parts being constructed and combined according to the best mode of procedure I have so far devised for the application of the principle.

Figure 1:
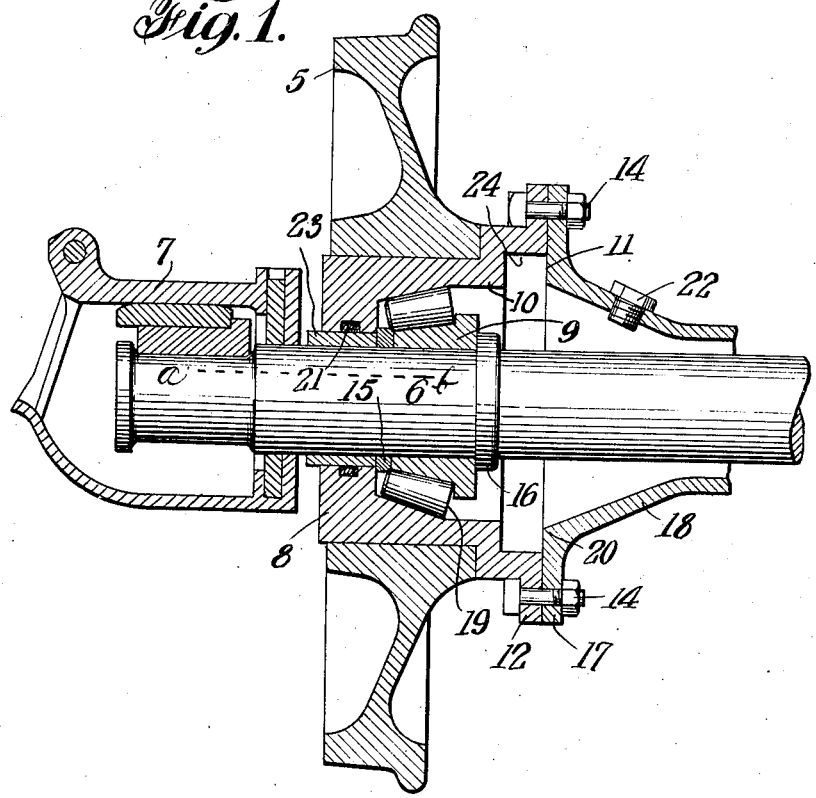
Figure 2:
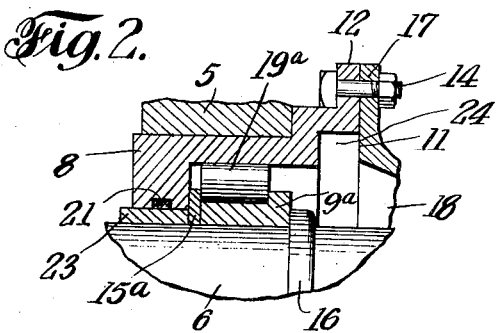

The Figure 1 is a longitudinal vertical section of approximately one-half of a pair of united wheels, and an anti-friction bearing located within the hub of the wheel, and a well known type of journal box; the half of the longitudinal axle being shown in side elevation. Figure 2 shows in section the above-mentioned modification.

The numeral 6 designates the axle having a stop ring or enlargement 16 preferably integral with the axle, and a projecting end engaged by the journal box 7 through which weight is transmitted to the axle. Any other means than the journal box may be substituted for performing this function. The tubular or hollow axle 18 is of the shape shown, bell-shaped at the ends, and has a flange 17 perforated for the passage of threaded bolts 14, the opening through the hollow axle being large enough to allow the passage therethrough of the stop ring or enlargement 16 when said ring is integral with the axle.

A cylindrical housing located mainly within the wheel hub surrounds the axle and is of greater diameter at the end 10 than at the end 8, the housing providing a chamber for the reception of the anti-friction elements. A circular perforated flange 12 is present which matches the flange 17 to which it is firmly secured by the threaded bolts 14 and nuts. The opening through end 8 of the housing is of slightly greater diameter than the diameter of the axle. Within the housing are located the antifriction elements, comprising, in this instance, rings 15 and 9, the latter having a beveled or inclined circular surface for the rollers 19, which rollers also engage the interior surface of the housing. At the end 8 of the housing is provided a ring 23 and a felt or other packing 21 to prevent dust passing from outside the housing to the bearings. The wheel 5 has a central opening and said wheel is pressed onto the end 8 of the housing by hydraulic or other pressure so it will rotate with the housing and hollow axle, or the wheel may be forged to the housing. Obviously, the stop rings 16 on the axle prevent any perceptible movements of the wheels and tubular or hollow axle relative to the axle 6, and vice versa. Means may be provided for introducing a lubricant to the anti-friction bearings, such as a threaded plug 22.

It will be seen that the weight of a load is transmitted to the axle and then through the anti-friction elements and housings to the wheels.

As shown by the example illustrated, the anti-friction elements are located within the hub of the wheel, and preferably in line with or adjacent to a plane passing through the tread and hub of the wheel. This arrangement keeps within practical limits the distance from the point A to the point B of the axle—or the distance from the journal bearing to the rollers 19—so that the weight of the load will not bend the axle end outside the antifriction bearings.

Figure 2 shows the modified antifriction bearing. It consists in substituting for the tapering rollers 19 the cylindrical rollers 19ª, and for the rings 15 and 9 rings 15ª and 9ª with surfaces which match the exterior and end surfaces of the cylindrical rollers. The interior surface of the housing 8 is also changed from an inclined to a horizontal surface for engagement by the cylinders.

When crossing rough and uneven frogs the bearings incline with the wheels, thereby preventing twisting and cracking of the rollers.

In the practical embodiment of the invention changes may be introduced without constituting substantial departures.

What I claim is:

1. The combination with an axle, of wheels, anti-friction elements between the wheels and axle located within the hubs of the wheels, a hollow or tubular axle, and means connecting the wheels and hollow or tubular axle; said anti-friction elements being insertable and removable only by detaching the hollow or tubular axle from the wheels.

2. The subject-matter of claim 1 wherein said axle is provided with means, as rings, engaged by parts of the anti-friction elements to prevent the longitudinal movements of the axle relative to the wheels and hollow or tubular axle.

3. The combination with an axle, of wheels, anti-friction elements within the hubs of the wheels and outside the axle, a hollow or tubular axle with flanges at the ends, and means for detachably connecting the flanges of the hollow or tubular axle to the wheels at their sides which face each other; said anti-friction elements being insertable and removable only by detaching the ends of the hollow or tubular axle from the wheels.

4. The combination with an axle having stop rings thereon, of a hollow or tubular axle, housings, means for detachably connecting the tubular axle and housings, anti-friction elements between the housings and the axle, and wheels supported by the housings; the wheels, housings and hollow axle having rotary motion relative to the axle.

5. The subject-matter of claim 4 wherein the anti-friction elements are located inside the hubs of the wheels.

6. The combination with an axle, of housings, a hollow or tubular axle detachably secured to the housings, and wheels secured to the housings, so they all may rotate together; and anti-friction elements between the housings and the axle.

7. The subject-matter of claim 6 wherein means are provided to prevent the longitudinal movements of the axle relative to the hollow or tubular axle, housings and wheels, and vice versa.

8. The subject-matter of claim 6 wherein the ends of the axle project beyond the wheels and are provided with means for transmitting the weight of the load to the axle.

In testimony whereof, I affix my signature.

ADONIRAM J. COOK.